(12) United States Patent
Hansen et al.

(10) Patent No.: US 12,044,652 B2
(45) Date of Patent: Jul. 23, 2024

(54) ION SELECTIVE MEMBRANES AND THE PREPARATION THEREOF

(71) Applicant: Radiometer Medical ApS, Bronshoj (DK)

(72) Inventors: Thomas Steen Hansen, Bronshoj (DK); Thomas Pedersen Nygaard, Bronshoj (DK); Peter Jakobsen Neilson, Bronshoj (DK); Kristian Medom Hansen, Bronshoj (DK); Palle Schneider, Bronshoj (DK)

(73) Assignee: Radiometer Medical ApS, Brønshøj (DK)

( * ) Notice: Subject to any disclaimer, the term of this patent is extended or adjusted under 35 U.S.C. 154(b) by 803 days.

(21) Appl. No.: 17/256,291

(22) PCT Filed: Jun. 21, 2019

(86) PCT No.: PCT/EP2019/066505
§ 371 (c)(1),
(2) Date: Dec. 28, 2020

(87) PCT Pub. No.: WO2020/007625
PCT Pub. Date: Jan. 9, 2020

(65) Prior Publication Data
US 2021/0262971 A1 Aug. 26, 2021

(30) Foreign Application Priority Data
Jul. 4, 2018 (DK) .................................. 2018 00323

(51) Int. Cl.
*G01N 27/414* (2006.01)
*G01N 27/333* (2006.01)

(52) U.S. Cl.
CPC ....... *G01N 27/414* (2013.01); *G01N 27/3335* (2013.01)

(58) Field of Classification Search
None
See application file for complete search history.

(56) References Cited

FOREIGN PATENT DOCUMENTS

| CN | 108593745 A | 9/2018 |
|---|---|---|
| JP | 62-52449 A | 9/1984 |
| JP | 2000-065791 A | 3/2000 |
| JP | 2002-510540 A | 4/2002 |
| JP | 2004-340965 A | 12/2004 |
| WO | WO 92/16831 | 10/1992 |

OTHER PUBLICATIONS

H. Wada, et al., "Preparation and Examination of Calcium Ion-Selective Electrodes for Flow Analysis", Analytica Chimica Acta, 211: p. 213-221, Jan. (Year: 1988).*
Craggs, A. et al., "PVC Ion-Selective Electrodes Based on Calcium BIS-[Dialkyl—and DI-(4-Alkylphenyl) Phosphates] and Mixed Solvent Mediators," Talanta, vol. 27, pp. 277-280 (1980).
Spichiger, Ursula E et al., "Critical Parameters and Optimization of a Magnesium-Selective Liquid Membrane Electrode for Application to Human Blood Serum," Fresenius J. Anal Chem., 341, pp. 727-731 (1991).
International Search Report for International Application No. PCT/EP2019/066505, Sep. 26, 2019 (two pages).
Written Opinion of the International Searching Authority for International Application No. PCT/EP2019/066505 (ten pages).

* cited by examiner

*Primary Examiner* — J. Christopher Ball
(74) *Attorney, Agent, or Firm* — FINNEGAN, HENDERSON, FARABOW, GARRETT & DUNNER, LLP

(57) ABSTRACT

Processes for preparing ion selective membranes are presented which have selectivity for a primary analyte (in particular magnesium) as well as another ion (in particular calcium), wherein said process comprises addition of a) an ionophore (in particular 1,10-phenanthroline), b) a lipophilic salt containing said primary analyte (in particular hemi-magnesium bis[4-octylphenyl]phosphate) and c) a lipophilic salt containing said other ion (in particular hemi-calcium bis[4-octylphenyl]phosphate). Also, ion selective membranes are presented which are prepared using said processes, in particular to membranes selective for magnesium ions. In further aspects, electrodes and potentiometric sensors are presented comprising such membranes and the use thereof for determining ion concentrations in samples.

20 Claims, No Drawings

ION SELECTIVE MEMBRANES AND THE PREPARATION THEREOF

This application is a national stage filing under 35 U.S.C. § 371 of International Application No. PCT/EP2019/066505, filed on Jun. 21, 2019, which claims priority of Danish Patent Application No. PA 2018 00323, filed on Jul. 4, 2018. The contents of these applications are each incorporated herein by reference in their entirety.

FIELD OF THE INVENTION

The invention relates to ion selective membranes and processes for the preparation thereof, in particular to membranes selective for magnesium ions and the preparation thereof. In further aspects, the invention relates to electrodes and potentiometric sensors comprising such membranes and the use thereof for determining ion concentrations in samples.

BACKGROUND OF THE INVENTION

Ion selective electrodes are electrodes that when used in a potentiometric sensor allow determination of the activity of an analyte ion in the presence of other interfering ions. A broad range of electrodes and sensors selective for various anions and cations is available. However, obtaining absolute selectivity for a particular ion is challenging and sometimes not possible. Thus, ion selective membranes used in some electrodes do not fully discriminate between the primary analyte and other ions. This is, for instance, often the case for divalent ion selective electrodes, which do not have absolute selectivity for particular divalent ions over other divalent ions.

Magnesium is a common metal in the human body and plays an important role in chemical and biochemical processes. Magnesium in the body is either protein-bound, complexed to anions or present as a free ionized fraction (iMg). The iMg fraction plays several physiological roles, e.g. as an ion channel adjuster in nerve conduction or skeletal, cardiac or uterine muscle contraction. A high prevalence of hypomagnesemia (11%) and hypermagnesemia (9.3%) has been found in a study amongst hospitalized patients (Wong et al. (1983) Am J Clin Pathol 79:348).

Specific measurement of iMg is challenging and, historically, clinical laboratories have often relied on total magnesium assays. Magnesium ion selective sensors have been described in WO92/16831 (Nova Biomedical Corp.), which discloses a magnesium selective membrane including a 1,10-phenanthroline as a magnesium ion selective compound. WO2015/160755 (Siemens Healthcare Diagnostics Inc.) describes a membrane for detecting ionized magnesium comprising ionophores having a tripodal stereochemical structure, a lipophilic borate salt and a polymer matrix. However, these magnesium ion selective membranes still have selectivity for other ions than magnesium ions, in particular calcium ions.

Ion selective electrodes that do not have absolute selectivity for the primary analyte often require long start-up times upon use, because, when such an electrode is mounted in the analyzer and is exposed to a solution, e.g. a rinse solution, an equilibration process begins, where the primary analyte from the electrode is partially replaced by other ions from the rinse solution. This has two consequences:

1) The rinse composition in front of the electrode is changed due to release of primary analyte and uptake of other ions. This may result in a problem on the subsequent measurements (where a certain composition of rinse is assumed)
2) The electrochemical properties of the electrode are not stable as the membrane changes composition, hence frequent calibrations are required to fulfill performance requirements.

Hence, upon first usage of such prepared ion selective electrodes a conditioning time (start-up time) is required to allow a sufficient level of equilibration.

Thus, there is a need for improved ion selective electrodes that have a more rapid start-up time. This need is addressed by the current invention.

SUMMARY OF THE INVENTION

In a first main aspect, the invention relates to a process for preparing an ion selective membrane which has selectivity for a primary analyte as well as another ion, wherein said process comprises addition, in any order, of
  a) an ionophore,
  b) a lipophilic salt containing said primary analyte, and
  c) a lipophilic salt containing said other ion.

In a further aspect, the invention relates to an ion selective membrane which has selectivity for a primary analyte as well as one or more other ions, wherein said membrane has not been in contact with an aqueous solution and comprises:
  a) an ionophore,
  b) a lipophilic salt containing said primary analyte, and
  c) a lipophilic salt containing said other ion.

In an even further aspect, the invention relates to a method for producing an ion selective membrane for use in the measurement of ion concentration in a sample wherein said membrane has selectivity for a primary analyte as well as another ion, said method comprising the steps of:
  i) selecting a rinse solution in which the membrane is to be kept immediately prior to analysis of a sample, wherein said rinse solution contains said primary analyte as well as said other ion,
  ii) selecting an ion selective membrane composition comprising a ionophore (a), a lipophilic salt (b) containing said primary analyte, and a lipophilic salt (c) containing said other ion, wherein the molar ratio of the lipophilic salts defined in (b) and (c) is such that when the membrane is exposed to said rinse solution, the equilibration time is shorter than when the membrane would not contain the lipophilic salt defined in (c), preferably wherein the molar ratio of the lipophilic salts (b) and (c) in the membrane is selected such that no equilibration is required, and
  iii) producing a membrane having the composition selected in step ii) according to the process of the invention.

In a further aspect the invention relates to a process for preparing an ion selective membrane which has selectivity for a primary analyte as well as another ion, wherein said process comprises addition of:
  a) a lipophilic salt which is a salt of an ionophore covalently linked to an acidic group via a spacer and the primary analyte, and
  b) a lipophilic salt which is a salt of said ionophore and said other ion.

In an even further aspect, the invention relates to an ion selective membrane which has selectivity for a primary analyte as well as another ion, wherein said membrane comprises:

a) a lipophilic salt which is a salt of an ionophore covalently linked to an acidic group via a spacer and the primary analyte, and b) a lipophilic salt which is a salt of said ionophore and said other ion wherein said membrane preferably has not been in contact with an aqueous solution.

In a further aspect, the invention provides an electrode for determining the ion concentration of a liquid sample comprising the membrane of the invention as defined herein.

In an even further aspect, the invention provides a potentiometric sensor for determining the ion concentration of a liquid sample comprising a membrane of the invention or an electrode of the invention.

Furthermore, the invention relates to a method for determining the ion concentration of a liquid sample comprising contacting said sample with an electrode according to the invention or a potentiometric sensor according to the invention and determining the magnesium ion concentration based on signals provided by said electrode or potentiometric sensor. The invention also relates to a method for diagnosing a disease or disorder comprising performing the method for determining the ion concentration according to the invention on a sample of a subject.

These and other aspects and embodiments of the invention are described in further detail below.

DETAILED DESCRIPTION OF THE INVENTION

Definitions

The term "selective" when used herein in the context of a membrane or electrode refers to a preference for a particular ion. "selective" when used herein does not mean absolute or exclusive selectivity, i.e. a membrane can be selective for multiple ions, e.g. magnesium ions as well as calcium ions.

The term "primary analyte", when used herein refers to the cation or anion for which the ion selective electrode is designed and typically the ion for which the membrane in the electrode is most selective, i.e. has the highest preference. In an important embodiment, the primary analyte is a divalent ion, such as magnesium.

The term "equilibration time" refers to the time required to reach an equilibrium between the membrane of the electrode and the solution with which the membrane is in contact. During the equilibration time, ions from the electrode are replaced by other ions from the solution for which the membrane has selectivity.

The term "rinse solution" when used herein, refers to the solution, typically an aqueous solution, with which the membrane is in contact immediately prior to the contact with a sample.

When used herein, the term "ionophore" refers to a compound that reversibly binds ions, e.g. a compound that can transport ions across a membrane.

The term "lipophilic" when used herein, in particular in the context of a "lipophilic salt", refers to the ability of a chemical compound to dissolve in fats, oils, lipids, or non-polar solvents.

The term "acidic group" refers to a group capable of ionizing to donate a hydrogen ion to a base.

The term "salt" when used herein refers to a deprotonated form of an acid together with a cationic species to counterbalance the negative charge thereof.

When used herein, the term "substituted form" of 1,10-phenanthroline refers to a substance which comprises a 1,10-phenanthroline skeleton containing one or more substitutions thereto. The term "substitution" refers to the replacement of a hydrogen on 1,10-phenanthroline with a group R or residue R. Similarly, "substituted aryl" refers to an aryl group wherein a hydrogen has been replaced with a different residue or group. The term "$C_{XX-YY}$" in the context of a chemical group indicates that the group contains from XX to YY carbon atoms, i.e. any number starting from XX up to and including YY, for example a $C_{1-18}$ alkyl group contains 1, 2, 3, 4, 5, 6, 7, 8, 9, 10, 11, 12, 13, 14, 15, 16, 17 or 18 carbon atoms. Unless specified otherwise, such a group may be linear or branched.

When referring to chemical groups, the terms "alkyl", "aryl", "alkenyl" and "alkynyl" have their usual meaning in the art. In some embodiments, such groups comprise no more than 18 carbon atoms. The term "branched alkyl" refers to an alkyl group which is not fully linear, i.e. has at least one side-chain.

The term "concentration" when used herein in the context of determining a concentration of ions, such as magnesium ions, in a sample, refers to the stoichiometric concentration of the ion in a standardized solution matrix (reference scale) having an ion activity which is equal to that of the measured sample, cf. IFCC guidelines (Ben Rayana et al. (2008) Clin Chem Lab Med 46(1):21).

When used herein in connection with a polymer, the term molecular weight refers to the weight average molecular weight, calculated by: $M_w = \Sigma W_i M_i$, wherein $W_i$ is the weight fraction of polymer with molecular weight $M_i$

Further Aspects and Embodiments of the Invention

As explained above, in a first main aspect, the invention provides a process for preparing an ion selective membrane which has selectivity for a primary analyte as well as another ion, wherein said process comprises addition, in any order, of a) an ionophore, b) a lipophilic salt containing said primary analyte, and c) a lipophilic salt containing said other ion.

"another ion" herein means at least one other ion, i.e. the membrane has selectivity for the primary analyte and at least one other ion, such as one other ion, two other ions, three other ions, etc. In some embodiments, the process comprises addition of further lipophilic salts containing said other ions, e.g. the process can besides the addition of the lipophilic salt defined in c) comprises addition of one or more further lipophilic salts containing further ions for which the membrane has selectivity. For example, in one embodiment, the primary analyte is magnesium ions and other ions for which the membrane has selectivity are calcium ions and zinc ions. The process may thus comprise addition of both a lipophilic salt containing calcium as well as a lipophilic salt containing zinc. In another embodiment, said other ion comprises one or more ions selected from the group consisting of: $Ca^{2+}$, $Zn^{2+}$, $Na^+$, $K^+$, $Li^+$, $H^+$, $NH_4^+$, $Cs^+$, $Rb^+$, $Cu^{2+}$, $Ni^{2+}$, $Fe^{2+}$, $Sr^{2+}$, $Ba^{2+}$, $Co^{2+}$, $Cd^{2+}$ and $Al^{3+}$.

In one embodiment of the process, the primary analyte is a divalent ion. In another embodiment, said other ion is a divalent ion.

In one embodiment of the process of the invention, the molar ratio of the lipophilic salts defined in b) and c) is such that when the membrane is exposed to a rinse solution containing said primary analyte as well as said other ion, the equilibration time is shorter than when the membrane would not contain the lipophilic salt defined in c). In preferred embodiments, the equilibration time is less than 2 hours, e.g.

less than 1.5 hour, such as less than 1 hour, e.g. less than 45 min, such as less than 30 min, e.g. less than 15 min, such as less than 10 min, e.g. less than 5 min. Most preferably, the equilibration time is zero.

In one embodiment, the molar ratio of the lipophilic salts defined in b) and c) is between 99:1 and 1:1, such as between 20:1 and 1:1, e.g. between 20:1 and 3:1, such as between 10:1 and 4:1.

In one embodiment, the primary analyte is magnesium ions, calcium ions, zinc ions or phosphate ions. In a further embodiment, primary analyte is magnesium ions and the lipophilic salt defined in b) is a magnesium salt and the lipophilic salt defined in c) is a calcium salt.

In a further embodiment, the primary analyte is magnesium ions, the lipophilic salt defined in b) is a magnesium salt and the lipophilic salt defined in c) is a calcium salt, and the rinse solution defined hereinabove comprises magnesium ions and calcium ions in a molar ratio from 1:1 to 1:4, e.g. a molar ratio of 1:1.5 to 1:2.5, such as a molar ratio of 1:2. In one embodiment, the rinse solution comprises 0.25 mM $Mg^{2+}$ and 0.5 mM $Ca^{2+}$. In a further embodiment, the molar ratio of the lipophilic magnesium salt b) and the lipophilic calcium salt c) is between 99:1 and 1:1, such as between 20:1 and 1:1, e.g. between 20:1 and 3:1, such as between 10:1 and 4:1, e.g. 17:3.

The process of the invention may comprise mixing the components in a solvent, dispensing the resulting solution on a desired support and allowing the solvent to evaporate. Any suitable solvent may be used. In one embodiment, the solvent is cyclohexanone. The support may be flexible or rigid. The support is preferably made of non-conducting material such as silicon, polymer, a printed circuit board (PCB), flex-PCB, polyethylene terephthalate (PET), polyimide (PI), ceramic, alumina, glass, wood product, frit, etc.

In a further main aspect, the invention relates to an ion selective membrane which has selectivity for a primary analyte as well as one or more other ions, wherein said membrane has not been in contact with an aqueous solution and comprises:
a) an ionophore,
b) a lipophilic salt containing said primary analyte, and
c) a lipophilic salt containing said other ion.

In one embodiment of the membrane, the primary analyte is a divalent ion. In another embodiment, said other ion is a divalent ion.

In one embodiment, the molar ratio of the lipophilic salts defined in b) and c) is such that when the membrane is exposed to a rinse solution containing said primary analyte as well as said other ion, the equilibration time is shorter than when the membrane would not contain the lipophilic salt defined in c). In preferred embodiments, the equilibration time is less than 2 hours, e.g. less than 1.5 hour, such as less than 1 hour, e.g. less than 45 min, such as less than 30 min, e.g. less than 15 min, such as less than 10 min, e.g. less than 5 min.

In another embodiment of the membrane, the molar ratio of the lipophilic salts defined in b) and c) is between 99:1 and 1:1, such as between 20:1 and 1:1, e.g. between 20:1 and 3:1, such as between 10:1 and 4:1.

In one embodiment, the primary analyte is magnesium ions, calcium ions, zinc ions or phosphate ions. In a further embodiment, the primary analyte is magnesium ions and the lipophilic salt defined in b) is a magnesium salt and the lipophilic salt defined in c) is a calcium salt. In an even further embodiment, the primary analyte is magnesium ions, the lipophilic salt defined in b) is a magnesium salt and the lipophilic salt defined in c) is a calcium salt, and the rinse solution defined hereinabove comprises magnesium ions and calcium ions in a molar ratio from 1:1 to 1:4, e.g. a molar ratio of 1:1.5 to 1:2.5, such as a molar ratio of 1:2. In one embodiment, the rinse solution comprises 0.25 mM $Mg^{2+}$ and 0.5 mM $Ca^{2+}$. In a further embodiment, the molar ratio of the lipophilic magnesium salt b) and the lipophilic calcium salt c) is between 99:1 and 1:1, such as between 20:1 and 1:1, e.g. between 20:1 and 3:1, such as between 10:1 and 4:1, e.g. 17:3.

In a further main aspect, the invention relates to a method for producing an ion selective membrane for use in the measurement of ion concentration in a sample wherein said membrane has selectivity for a primary analyte as well as another ion, said method comprising the steps of:
i) selecting a rinse solution in which the membrane is to be kept immediately prior to analysis of a sample, wherein said rinse solution contains said primary analyte as well as said other ion,
ii) selecting an ion selective membrane composition comprising a ionophore (a), a lipophilic salt (b) containing said primary analyte, and a lipophilic salt (c) containing said other ion, wherein the molar ratio of the lipophilic salts defined in (b) and (c) is such that when the membrane is exposed to said rinse solution, the equilibration time is shorter than when the membrane would not contain the lipophilic salt defined in (c), preferably wherein the molar ratio of the lipophilic salts (b) and (c) in the membrane is selected such that no equilibration is required, and
iii) producing a membrane having the composition selected in step ii) according to the process of the invention.

Ionophores

As described above, the process of the invention comprises adding an ionophore or a mixture of ionophores. Likewise, the ion selective membrane of the invention comprises an ionophore. The ionophore used may be charged or not charged (neutral). In some embodiments, the ionophore is lipophilic.

In a preferred embodiment, the ionophore is a phenanthroline compound which is 1,10-phenanthroline or a substituted form thereof. Such compounds have e.g. been described in WO92/16831 (Nova Biomedical Corp.). 1,10-phenanthroline has the following structure:

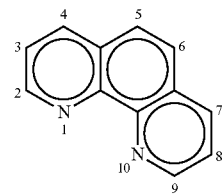

In one embodiment, the carbon atoms at positions 2 and 9 of the phenanthroline compound are bonded to a hydrogen.

In one embodiment, the ionophore is a compound of the Formula II:

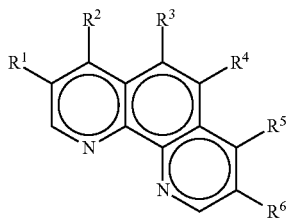

wherein each of $R^1$—$R^6$ is any of:
H;
any of F, Cl, Br, I, $NO_2$, CN, or $CF_3$;
$C_{1-18}$ alkyl;
$C_{1-18}$ aryl;
$C_{1-18}$ alkenyl;
$(CH_2)_m Y$, wherein m is 0 or an integer from 1 to 4, Y is any of —$OR^7$, —$NR^7R^8$, —$OCOR^7$, —$NR^7COR^8$, —$COR^7$, —$COOR^7$, —$SO_3R^7$, —$OSiR^7R^8R^9$, —$PO_4R^7R^8$, —$PO_3R^7R^8$, wherein each of $R^7$, $R^8$, and $R^9$ are any of H, alkyl, branched alkyl, aryl, or substituted aryl; or
$C_n$—$R^{10}R^{11}$, wherein n is 0 or an integer between 1 and 17 inclusive, $R^{10}$ is C, N, NCO, or $CH_2$—Z—$CH_2$ wherein Z is any of O, NH, S, OCO, or CO, $R^{11}$ is a compound of the Formula III:

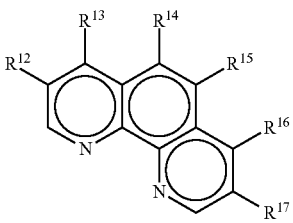

and $R^{11}$ is linked to $R^{10}$ at any of positions 3, 4, 5, 6, 7, or 8 of $R^{11}$, $R^{12}$—$R^{17}$ are any of H, $C_{1-18}$ alkyl, $C_{1-18}$ aryl, or deleted, provided that if $R^{11}$ is linked to $R^{10}$ at position 3 of $R^{11}$ then $R^{12}$ is deleted, if $R^{11}$ is linked to $R^{10}$ at position 4 of $R^{11}$ then $R^{13}$ is deleted, if $R^{11}$ is linked to $R^{10}$ at position 5 of $R^{11}$ then $R^{14}$ is deleted, if $R^{11}$ is linked to $R^{10}$ at position 6 of $R^{11}$ then $R^{15}$ is deleted, if $R^{11}$ is linked to $R^{10}$ at position 7 of $R^{11}$ then $R^{16}$ is deleted, if $R^{11}$ is linked to $R^{10}$ at position 8 of $R^{11}$ then $R^{17}$ is deleted,
provided that one of $R^1$—$R^6$ is other than H and that each of the C atoms at positions 2 and 9 of the 1,10-phenanthroline is bonded, by the bond which does not participate in the fused ring structure, to an H.

In a further embodiment, $R^1$ to $R^6$ include a total of at least 6 carbon atoms, e.g. 6, 7, 8, 9 10 or 11 carbon atoms, such as a total of at least 11 carbon atoms, e.g. between 11 and 18 carbon atoms.

In another embodiment, one or more of $R^1$, $R^2$, $R^3$, $R^4$, $R^5$ and $R^6$ is an alkyl or aryl group having between 1 and 18 carbon atoms. For example, one or two groups selected from $R^1$, $R^2$, $R^3$, $R^4$, $R^5$ and $R^6$ may be an alkyl or aryl group having between 1 and 18 carbon atoms and the others are hydrogen, e.g. $R^1$ and $R^2$, $R^1$ and $R^3$, $R^1$ and $R^4$, $R^1$ and $R^5$, $R^1$ and $R^6$, $R^2$ and $R^3$, $R^2$ and $R^4$, $R^2$ and $R^5$, $R^2$ and $R^6$, $R^3$ and $R^4$, $R^3$ and $R^5$, $R^3$ and $R^6$, $R^4$ and $R^5$, $R^4$ and $R^6$ or $R^5$ and $R^6$ are alkyl or aryl groups having between 1 and 18 carbon atoms and the other groups are hydrogen.

In another embodiment, one or more of $R^1$, $R^2$, $R^3$, $R^4$, $R^5$ and $R^6$ is an alkyl group having between 1 and 18 carbon atoms. For example, one or two groups selected from $R^1$, $R^2$, $R^3$, $R^4$, $R^5$ and $R^6$ may be an alkyl group having between 1 and 18 carbon atoms and the others are hydrogen, e.g. $R^1$ and $R^2$, $R^1$ and $R^3$, $R^1$ and $R^4$, $R^1$ and $R^5$, $R^1$ and $R^6$, $R^2$ and $R^3$, $R^2$ and $R^4$, $R^2$ and $R^5$, $R^2$ and $R^6$, $R^3$ and $R^4$, $R^3$ and $R^5$, $R^3$ and $R^6$, $R^4$ and $R^5$, $R^4$ and $R^6$ or $R^5$ and $R^6$ are alkyl groups having between 1 and 18 carbon atoms and the other R groups are hydrogen.

In another embodiment, one or more of $R^1$, $R^2$, $R^3$, $R^4$, $R^5$ and $R^6$ is an alkyl group having between 6 and 18 carbon atoms. For example, one or two groups selected from $R^1$, $R^2$, $R^3$, $R^4$, $R^5$ and $R^6$ may be an alkyl group having between 6 and 18 carbon atoms and the others are hydrogen, e.g. $R^1$ and $R^2$, $R^1$ and $R^3$, $R^1$ and $R^4$, $R^1$ and $R^5$, $R^1$ and $R^6$, $R^2$ and $R^3$, $R^2$ and $R^4$, $R^2$ and $R^5$, $R^2$ and $R^6$, $R^3$ and $R^4$, $R^3$ and $R^5$, $R^3$ and $R^6$, $R^4$ and $R^5$, $R^4$ and $R^6$ or $R^5$ and $R^6$ are alkyl groups having between 6 and 18 carbon atoms and the others are hydrogen.

In another embodiment, only one of $R^1$, $R^2$, $R^3$, $R^4$, $R^5$ and $R^6$ is an alkyl group having between 1 and 18 carbon atoms, such as between 6 and 18 carbon atoms, e.g. between 11 and 18 carbon atoms and the other R groups are hydrogen.

In another embodiment, $R^2$ and/or $R^5$ is an alkyl group having between 1 and 18 carbon atoms, such as between 6 and 18 carbon atoms, e.g. between 11 and 18 carbon atoms and the other R groups are hydrogen. In another embodiment, $R^2$ and/or $R^5$ is an aryl group having between 1 and 18 carbon atoms.

In a preferred embodiment, the ionophore is 4-undecyl-1,10-phenanthroline or 4,7-diundecyl-1,10-phenanthroline.

Substituted 1,10-phenanthroline compounds may be synthesized by standard techniques known to those skilled in the art. For example, the synthesis of 4- and 4,7-substituted 1,10-phenanthrolines are described in Lund et al., J. Chem. Eng. Data, 26: 227-29 (1981), hereby incorporated by reference. Methyl groups can provide a handle for the attachment of the desired side-chain in the synthesis of other 1,10-phenanthroline derivatives, and methyl substituted 1,10-phenanthrolines are commercially available. For example, 4-methyl, 5-methyl, 6-methyl, 7-methyl, 3,6-dimethyl, 5,7-dimethyl, 4,7-dimethyl, and 5,6-dimethyl-1,10-phenanthroline are all available from Aldrich Chemical Co. 4-undecyl-1,10-phenanthroline and 4,7-diundecyl-1,10-phenanthroline may e.g. be synthesized as described in WO92/16831 (Nova Biomedical Corp.).

In another embodiment, the ion selective membrane comprises an ionophore having a tripodal stereochemical structure, e.g. a tripodal structure such as the ones described in WO2015/160755 (Siemens Healthcare Diagnostics Inc.).

Thus, in one embodiment, the ionophore is a compound according to Formula IV (also termed ETH5506 in the art):

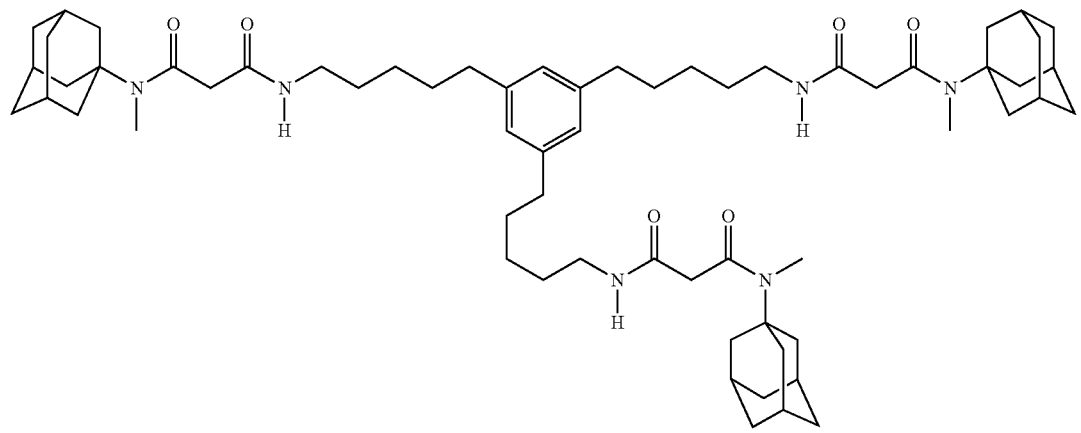 [SMILES: CN(C(=O)CC(=O)NCCCCCc1cc(CCCCCNC(=O)CC(=O)N(C)C23CC4CC(CC(C4)C2)C3)cc(CCCCCNC(=O)CC(=O)N(C)C23CC4CC(CC(C4)C2)C3)c1)C12CC3CC(CC(C3)C1)C2]

In another embodiment, the ionophore is a compound according to Formula V (also termed ETH5504 in the art):

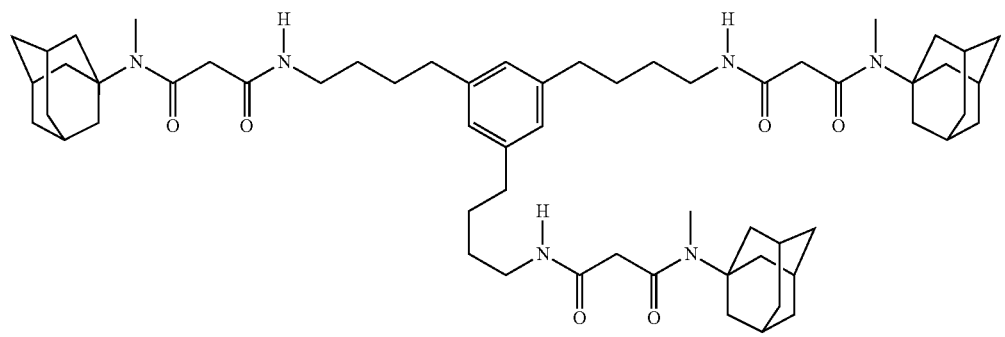 [SMILES: CN(C(=O)CC(=O)NCCCCc1cc(CCCCNC(=O)CC(=O)N(C)C23CC4CC(CC(C4)C2)C3)cc(CCCCNC(=O)CC(=O)N(C)C23CC4CC(CC(C4)C2)C3)c1)C12CC3CC(CC(C3)C1)C2]

In another embodiment, the ionophore is a compound according to Formula VI (also termed ETH3832 in the art):

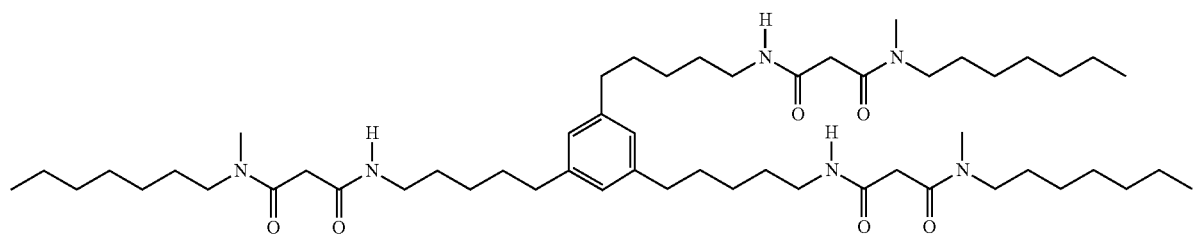 [SMILES: CCCCCCCN(C)C(=O)CC(=O)NCCCCCc1cc(CCCCCNC(=O)CC(=O)N(C)CCCCCCC)cc(CCCCCNC(=O)CC(=O)N(C)CCCCCCC)c1]

In another embodiment, the ionophore is a compound according to Formula VII, wherein n is an integer from 6 to 8 (termed ETH5282 in the art when n is 6; termed ETH7025 in the art when n is 8):

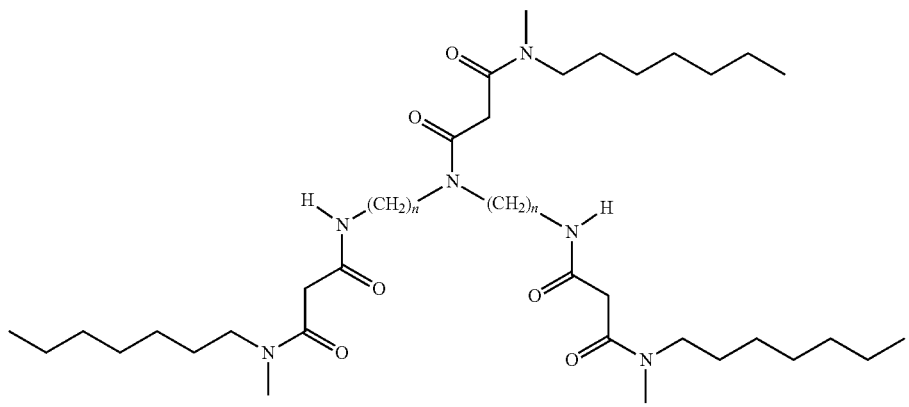

In another embodiment, the ionophore is one of the ionophores described in Table 8 of IUPAC 2000 Part I Inorganic cations Pure Appl Chem 72:1851, e.g. $Mg^{2+}$-1, $Mg^{2+}$-2 $Mg^{2+}$-3, $Mg^{2+}$-4, $Mg^{2+}$-5, $Mg^{2+}$-6, $Mg^{2+}$-7, $Mg^{2+}$-8, $Mg^{2+}$-9, $Mg^{2+}$-10, $Mg^{2+}$-11, $Mg^{2+}$-12, $Mg^{2+}$-13, $Mg^{2+}$-14, $Mg^{2+}$-15, $Mg^{2+}$-16, $Mg^{2+}$-17, $Mg^{2+}$-18, $Mg^{2+}$-19, $Mg^{2+}$-20, $Mg^{2+}$-21, $Mg^{2+}$-22, $Mg^{2+}$-23, $Mg^{2+}$-24, $Mg^{2+}$-25, $Mg^{2+}$-26, $Mg^{2+}$-27, $Mg^{2+}$-28, $Mg^{2+}$-29, $Mg^{2+}$-30, $Mg^{2+}$-31, $Mg^{2+}$-32, $Mg^{2+}$-33, $Mg^{2+}$-34, $Mg^{2+}$-35, $Mg^{2+}$-36, $Mg^{2+}$-37, $Mg^{2+}$-38, $Mg^{2+}$-39, $Mg^{2+}$-40, $Mg^{2+}$-41, $Mg^{2+}$-42, $Mg^{2+}$-43, $Mg^{2+}$-44, $Mg^{2+}$-45, $Mg^{2+}$-46, $Mg^{2+}$-47, $Mg^{2+}$-48, $Mg^{2+}$-49, $Mg^{2+}$-50, $Mg^{2+}$-51, $Mg^{2+}$-52, $Mg^{2+}$-53, $Mg^{2+}$-54, $Mg^{2+}$-55 or $Mg^{2+}$-56.

In another embodiment, the ionophore is one of the ionophores described in Buhlmann et al. (1998) Chem. Rev. 98:1593, e.g. $Mg^{2+}$-1, $Mg^{2+}$-2 $Mg^{2+}$-3, $Mg^{2+}$-4, $Mg^{2+}$-5, $Mg^{2+}$-6, $Mg^{2+}$-7, $Mg^{2+}$-8, $Mg^{2+}$-9, $Mg^{2+}$-10, $Mg^{2+}$-11, $Mg^{2+}$-12, $Mg^{2+}$-13, $Mg^{2+}$-14, $Mg^{2+}$-15 or $Mg^{2+}$-16.

In another embodiment, the ionophore is ETH 5220 (Zhang et al. (2011) Am. J. Biomed. Sci. 3:301) or ETH 2001, ETH 2002, ETH 2003 or ETH 2022 (Zhang et al. (2000) Anal. Sci. 16:11).

In another embodiment, the ionophore is ETH 1001, DBM, ETH 1117, cyclo(LPro-DLeu)$_5$, ETH 1224, ETH 2220, ETH 4030, ETH 5214, ETH 5282 or ETH 7025, all described in Spichiger (1993) Electroanalysis 5: 739.

In another embodiment, the ionophore is one of the ionophores described in Suzuki et al. (1995) Anal. Chem. 67:324 (herein incorporated by reference), preferably K22B5, an 18-membered diaza-crown having two malonamide side chains with an adamantyl group, or a variant thereof, such as K22B1B5 (Siswanta et al. (1997) Anal. Sci. 13:429.

In a preferred embodiment, the ionophore is 1,2-bis (diarylphosphine oxide)benzene (Saleh (1994) J. Electroanalytical Chem. 373:89) or methyl phenyl semicarbazone (Chandra et al. (2013) J. Chem., http://dx.doi.org/10.1155/2013/189464).

Lipophilic Salts

In most embodiments of the process or membrane of the invention, the lipophilic salt defined in b) and the lipophilic salt defined in c) have the same chemical structure, except for the primary analyte ion.

In preferred embodiments, the lipophilic salts defined in b) and c) are lipophilic salts of a compound comprising an acidic group, such as a lipophilic salt of a compound comprising the structure of formula I:

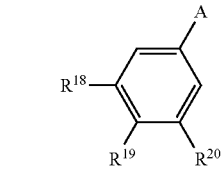

wherein A comprises an acidic group,
wherein one, two or all three of $R^{18}$, $R^{19}$ and $R^{20}$ is a $C_{4-18}$ group, which is a $C_{4-18}$ alkyl group, a $C_{4-18}$ alkenyl group, a $C_{4-18}$ alkynyl group, or an amide-containing $C_{4-18}$ group, wherein said $C_{4-18}$ group is linear at positions 1, 2 and 3, counting from the phenyl group, or in total only has one side chain at said positions 1, 2 and 3,
and wherein the others of $R^{18}$, $R^{19}$ and $R^{20}$ independently are hydrogen, or a linear $C_{1-18}$ alkyl group.

For the avoidance of doubt, the phrase "or in total only has one side chain at said positions 1, 2, and 3" herein means that each $C_{4-18}$ group in total only has one side-chain at said positions 1, 2, 3. Thus, in embodiments where two or more of $R^{18}$, $R^{19}$ and $R^{20}$ are $C_{4-18}$ groups, two or more of these $C_{4-18}$ groups may have one side-chain at position 1, 2 or 3.

For illustration, the following formula shows an embodiment wherein $R^{18}$ and $R^{20}$ are hydrogen and $R^{19}$ is a linear $C_8$ alkyl group without side chain. Positions 1, 2 and 3 are indicated:

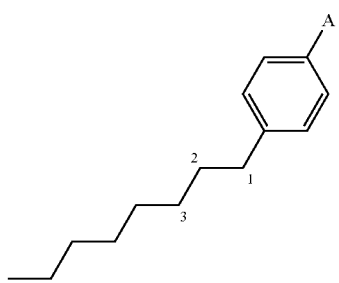

In one embodiment, the acidic group comprised within group A of formula I is a carboxylic acid, a sulfonic acid, a sulfuric acid monoester, a sulfonamide, a phosphonic acid, a phosphoric acid, an arsenic acid, a sulfinic acid or a thiocarboxylic acid.

In one embodiment, the acidic group comprised within group A of formula I is a carboxylic acid. For example, group A may be a carboxylic acid group according to formula IX, a carbonic acid group according to formula X, an oxalic acid monoester group according to formula XI or a dicarboxylic acid monoester group according to formula XII:

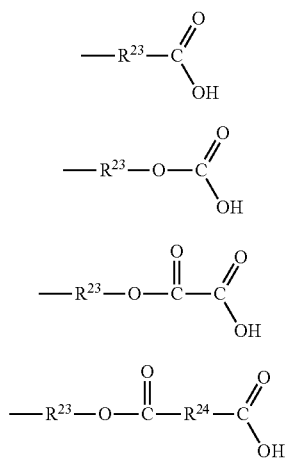

Formula IX

Formula X

Formula XI

Formula XII $R^{23}$ may be a $C_{1-5}$ group, e.g. a $C_{1-5}$ alkyl group, a $C_{1-5}$ alkenyl group, a $C_{1-5}$ alkynyl group, or an amide-containing $C_{1-5}$ group, or $R^{23}$ may be absent. Preferably $R^{23}$ is linear. E.g. in one embodiment of the compound according to formula IX, $R^{23}$ is absent and thus group A consists of a carboxylic acid group. $R^{24}$ in formula IX may be a $C_{1-5}$ group, e.g. a $C_{1-5}$ alkyl group, a $C_{1-5}$ alkenyl group, a $C_{1-5}$ alkynyl group, or an amide-containing $C_{1-5}$ group.

In another embodiment, the acidic group comprised within group A is a sulfonic acid. For example, group A may be a sulfonic acid group according to formula XIII:

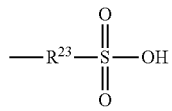

Formula XIII $R^{23}$ may be a $C_{1-5}$ group, e.g. a $C_{1-5}$ alkyl group, a $C_{1-5}$ alkenyl group, a $C_{1-5}$ alkynyl group, or an amide-containing $C_{1-5}$ group, or $R^{23}$ may be absent. Preferably $R^{23}$ is linear. E.g. in one embodiment of the compound according to formula XIII, $R^{23}$ is absent and thus group A consists of a sulfonic acid group.

In another embodiment, the acidic group comprised within group A is a sulfuric acid monoester. For example, group A may be a sulfuric acid monoester group according to formula XIV:

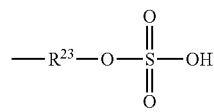

Formula XIV $R^{23}$ may be a $C_{1-5}$ group, e.g. a $C_{1-5}$ alkyl group, a $C_{1-5}$ alkenyl group, a $C_{1-5}$ alkynyl group, or an amide-containing $C_{1-5}$ group, or $R^{23}$ may be absent. Preferably $R^{23}$ is linear. E.g. in one embodiment of the compound according to formula XIV, $R^{23}$ is absent and thus group A consists of a sulfuric acid monoester group.

In another embodiment, the acidic group comprised within group A is a sulfonamide. For example, group A may be a sulfonamide group according to formula XV:

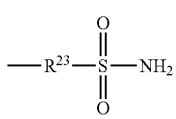

Formula XV $R^{23}$ may be a $C_{1-5}$ group, e.g. a $C_{1-5}$ alkyl group, a $C_{1-5}$ alkenyl group, a $C_{1-5}$ alkynyl group, or an amide-containing $C_{1-5}$ group, or $R^{23}$ may be absent. Preferably $R^{23}$ is linear. E.g. in one embodiment of the compound according to formula XV, $R^{23}$ is absent and thus group A consists of a sulfonamide group.

In another embodiment, the acidic group comprised within group A is a phosphonic acid. For example, group A may be a phosphonic acid group according to formula XVI or a phosphonic acid monoester group according to formula XVII:

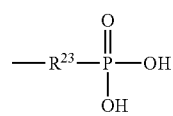

Formula XVI

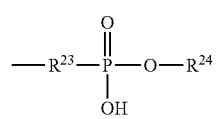

Formula XVII $R^{23}$ may be a $C_{1-5}$ group, e.g. a $C_{1-5}$ alkyl group, a $C_{1-5}$ alkenyl group, a $C_{1-5}$ alkynyl group, or an amide-containing $C_{1-5}$ group, or $R^{23}$ may be absent. Preferably $R^{23}$ is linear. E.g. in one embodiment of the compound according to formula XVI, $R^{23}$ is absent and thus group A consists of a phosphonic acid group. $R^{24}$ may be a $C_{1-18}$ group e.g. a $C_{1-18}$ alkyl group, a $C_{1-18}$ alkenyl group, a $C_{1-18}$ alkynyl group, an amide-containing $C_{1-18}$ group, or an aryl group. In particular the aryl group may be a phenyl group, e.g. $R^{24}$ may be a phenyl group having substituents $R^{18}$, $R^{19}$ and $R^{20}$, as defined in formula I.

In another embodiment, the acidic group comprised within group A is a phosphoric acid. For example, group A may be a phosphoric acid monoester group according to formula XVIII or a phosphoric acid diester group according to formula XIX, or a polyphosphoric acid group according to formula XX:

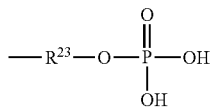

Formula XVIII

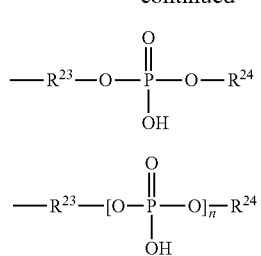

Formula XIX

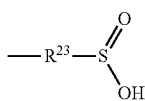

Formula XX $R^{23}$ may be a $C_{1-5}$ group, e.g. a $C_{1-5}$ alkyl group, a $C_{1-5}$ alkenyl group, a $C_{1-5}$ alkynyl group, or an amide-containing $C_{1-5}$ group, or $R^{23}$ may be absent. Preferably $R^{23}$ is linear. E.g. in one embodiment of the compound according to formula XVIII, $R^{23}$ is absent and thus group A consists of a phosphoric acid monoester group. In one embodiment of the compound according to formula XIX, $R^{23}$ is absent and thus group A consists of a phosphoric acid diester group. $R^{24}$ may be a $C_{1-18}$ group e.g. a $C_{1-18}$ alkyl group, a $C_{1-18}$ alkenyl group, a $C_{1-18}$ alkynyl group, an amide-containing $C_{1-18}$ group, or an aryl group. In particular the aryl group may be a phenyl group, e.g. $R^{24}$ may be a phenyl group having substituents $R^{18}$, $R^{19}$ and $R^{20}$, as defined in formula I.

In another embodiment, the acidic group comprised within group A is an arsenic acid. For example, group A may be a group according to formula XVI, XVII, XIII, XIX or XX, wherein the phosphorus atom has been replaced by an arsenic atom (As).

In another embodiment, the acidic group comprised within group A is a sulfinic acid. For example, group A may be a sulfinic acid group according to formula XXI:

Formula XXI

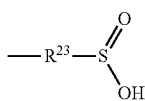

$R^{23}$ may be a $C_{1-5}$ group, e.g. a $C_{1-5}$ alkyl group, a $C_{1-5}$ alkenyl group, a $C_{1-5}$ alkynyl group, or an amide-containing $C_{1-5}$ group, or $R^{23}$ may be absent. Preferably $R^{23}$ is linear. E.g. in one embodiment of the compound according to formula XXI, $R^{23}$ is absent and thus group A consists of a sulfinic acid group.

In another embodiment, the acidic group comprised within group A is a thiocarboxylic acid. For example, group A may be a thiocarboxylic acid group according to formula XXII or formula XXIII:

Formula XXII

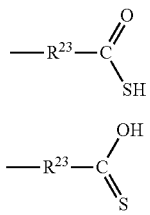

Formula XXIII $R^{23}$ may be a $C_{1-5}$ group, e.g. a $C_{1-5}$ alkyl group, a $C_{1-5}$ alkenyl group, a $C_{1-5}$ alkynyl group, or an amide-containing $C_{1-5}$ group, or $R^{23}$ may be absent. Preferably $R^{23}$ is linear.

E.g. in one embodiment of the compound according to formula XXII or formula XXIII, $R^{23}$ is absent and thus group A consists of a thiocarboxylic acid group.

In one embodiment, group A of formula I is phosphoric acid mono- or diester group, e.g. a group $-R^{23}-(HPO_4)-R^{24}$ according to formula XIX, wherein $R^{23}$ is absent or an alkyl (e.g. $C_{1-18}$ alkyl), branched alkyl, aryl, or substituted aryl, and $R^{24}$ is hydrogen or an alkyl (e.g. $C_{1-18}$ alkyl), branched alkyl, aryl, or substituted aryl.

In a further embodiment, the lipophilic salt(s) comprise(s) a compound of the Formula VIII:

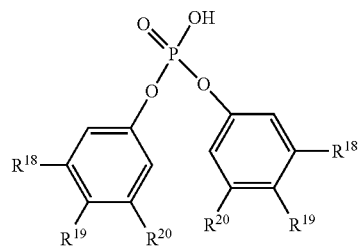

wherein $R^{18}$, $R^{19}$ and $R^{20}$ are as defined for Formula I. Preferably, the membrane comprises a salt of the lipophilic compound of Formula VIII.

In one embodiment, one of $R^{18}$, $R^{19}$ or $R^{20}$ is a $C_{4-18}$ alkyl group as defined above (i.e. a $C_{4-18}$ alkyl group which is linear at positions 1, 2 and 3, counting from the phenyl group, or in total only has one side chain at said positions 1, 2 and 3), and the others are, independently, hydrogen or a linear $C_{1-18}$ alkyl group.

In a further embodiment, one of $R^{18}$, $R^{19}$ or $R^{20}$ is a $C_{4-18}$ alkyl group as defined above and the others are hydrogen. In a further embodiment, $R^{19}$ is a $C_{4-18}$ alkyl group as defined above and $R^{18}$ and $R^{20}$ are hydrogen.

In one embodiment, said $C_{4-18}$ alkyl group(s) is/are linear. In another embodiment, said $C_{4-18}$ alkyl group(s) comprise(s) at least 6, such as at least 8 carbon atoms, e.g. 8, 9, 10, 11 or 12 carbon atoms.

In a further embodiment, only one of $R^{18}$, $R^{19}$ or $R^{20}$ is a $C_{4-18}$ alkyl group, and said $C_{4-18}$ alkyl group comprises at least 6, such as at least 8 carbon atoms, e.g. 8, 9, 10, 11 or 12 carbon atoms.

In a preferred embodiment, the lipophilic salt(s) comprise(s) a compound of the formula VIII wherein $R^{18}$ and $R^{20}$ are hydrogen and $R^{19}$ is an octyl group.

Preferred salts are magnesium salt and calcium salts.

In a preferred embodiment, the lipophilic salt defined in b) is hemi-magnesium bis[4-octylphenyl]phosphate and the lipophilic salt defined in c) is hemi-calcium bis[4-octylphenyl]phosphate.

In another preferred embodiment, the lipophilic salt defined in b) is hemi-magnesium bis[4-(1,1,3,3-tetramethylbutyl)phenyl]phosphate and the lipophilic salt defined in c) is hemi-calcium bis[4-(1,1,3,3-tetramethylbutyl)phenyl]phosphate.

Lipophilic salts, such as hemi-calcium bis[4-octylphenyl]phosphate and hemi-magnesium bis[4-octylphenyl]phosphate, may be prepared by standard methods known in the art.

In a preferred embodiment, the lipophilic salts are hemi-magnesium bis[4-octylphenyl]phosphate (b)) and hemi-calcium bis[4-octylphenyl]phosphate (c)), wherein the mixture contains at least 50% hemi-magnesium bis[4-octylphenyl]phosphate, such as at least 80% hemi-magnesium bis[4- octylphenyl]phosphate, e.g. between 80% and 90% hemi-magnesium bis[4-octylphenyl]phosphate.

In a further preferred embodiment of the ion selective membrane of the invention, the ionophore is 4,7-diundecyl-1,10-phenanthroline and the lipophilic salts are hemi-magnesium bis[4-octylphenyl]phosphate and hemi-calcium bis[4-octylphenyl]phosphate.

In a preferred embodiment, the molar ratio between the ionophore and the total of the anions of the lipophilic salts is between 2:1 and 1:1, such as a molar ratio between 1.8:1 and 1.2:1.

Besides the lipophilic compounds and lipophilic salts mentioned above, further salts may be present in the membrane of the invention. Thus, in embodiment, the membrane of the invention comprises a further salt, such as tetrakis(4-chlorophenyl)borate salt.

Ionophores Comprising a Covalently Linked Acidic Group

In a further aspect the invention relates to process for preparing an ion selective membrane which has selectivity for a primary analyte as well as another ion, wherein said process comprises addition of:
a) a lipophilic salt which is a salt of an ionophore covalently linked to an acidic group via a spacer and the primary analyte, and
b) a lipophilic salt which is a salt of said ionophore and said other ion.

In an even further aspect, the invention relates to an ion selective membrane which has selectivity for a primary analyte as well as another ion, wherein said membrane has not been in contact with an aqueous solution and comprises:
a) a lipophilic salt which is a salt of an ionophore covalently linked to an acidic group via a spacer and the primary analyte, and
b) a lipophilic salt which is a salt of said ionophore and said other ion.

In one embodiment, the primary analyte is magnesium ions and said other ion is calcium ions or zinc ions, preferably, calcium ions. In another embodiment, said other ion comprises one or more ions selected from the group consisting of: $Ca^{2+}$, $Zn^{2+}$, $Na^+$, $K^+$, $Li^+$, $H^+$, $NH_4^+$, $Cs^+$, $Rb^+$, $Cu^{2+}$, $Ni^{2+}$, $Fe^{2+}$, $Sr^{2+}$, $Ba^{2+}$, $Co^{2+}$, $Cd^{2+}$ and $Al^{3+}$.

In one embodiment, said spacer is an alkyl group, such as a linear or branched alkyl group having a total of from 1 to 18 carbon atoms, wherein the alkyl group optionally is substituted. In another embodiment, said spacer a linear alkyl group, e.g. a —$(CH_2)_n$—group, wherein n is at least 1, such as 1, 2, 3, 4 or 5, or at least 2.

In one embodiment, said ionophore is a phenanthroline compound which is 1,10-phenanthroline or a substituted form thereof. In one embodiment hereof, the spacer is covalently linked to the phenanthroline compound at the carbon atom at position 2, 3, 4, 5, 6, 7,8 or 9 of 1,10-phenanthroline.

In a further embodiment, the ionophore covalently linked to an acidic group via a spacer (wherein said spacer comprises at least one carbon atom) is a phenanthroline compound of the formula II:

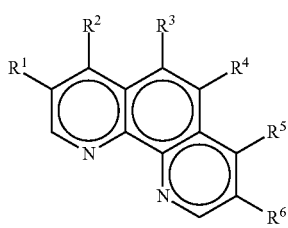

wherein each of $R^1$—$R^6$ is any of:
H;
any of F, Cl, Br, I, $NO_2$, CN, or $CF_3$;
$C_{1-18}$ alkyl;
$C_{1-18}$ aryl;
$C_{1-18}$ alkenyl;
$(CH_2)_mY$, wherein m is 0 or an integer from 1 to 4, Y is any of —$OR^7$, —$NR^7R^8$, —$OCOR^7$, —$NR^7COR^8$, —$COR^7$, —$COOR^7$, —$SO_3R^7$, —$OSiR^7R^8R^9$, —$PO_4R^7R^8$, —$PO_3R^7R^8$, wherein each of $R^7$, $R^8$, and $R^9$ are any of H, alkyl, branched alkyl, aryl, or substituted aryl; or $C_n$—$R^{10}R^{11}$, wherein n is 0 or an integer between 1 and 17 inclusive, $R^{10}$ is C, N, NCO, or $CH_2$—Z—$CH_2$ wherein Z is any of O, NH, S, OCO, or CO, $R^{11}$ is

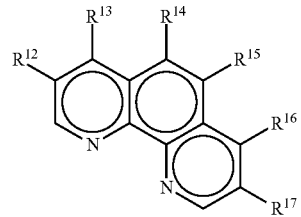

and $R^{11}$ is linked to $R^{10}$ at any of positions 3, 4, 5, 6, 7, or 8 of $R^{11}$, $R^{12}$—$R^{17}$ are any of H, $C_{1-18}$ alkyl, $C_{1-18}$ aryl, or deleted, provided that if $R^{11}$ is linked to $R^{10}$ at position 3 of $R^{11}$ then $R^{12}$ is deleted, if $R^{11}$ is linked to $R^{10}$ at position 4 of $R^{11}$ then $R^{13}$ is deleted, if $R^{11}$ is linked to $R^{10}$ at position 5 of $R^{11}$ then $R^{14}$ is deleted, if $R^{11}$ is linked to $R^{10}$ at position 6 of $R^{11}$ then $R^{15}$ is deleted, if $R^{11}$ is linked to $R^{10}$ at position 7 of $R^{11}$ then $R^{16}$ is deleted, if $R^{11}$ is linked to $R^{10}$ at position 8 of $R^{11}$ then $R^{17}$ is deleted;
provided that one of $R^1$—$R^6$ is other than H and that each of the C atoms at positions 2 and 9 of the 1,10-phenanthroline is bonded, by the bond which does not participate in the fused ring structure, to an H,
and wherein one of $R^1$ to $R^6$ comprises the spacer and the acidic group, preferably wherein $R^1$ or $R^6$ comprises the spacer and the acidic group.

In a further embodiment hereof, $R^1$ to $R^6$ include a total of at least 6 carbon atoms, e.g. 6, 7, 8, 9 10 or 11 carbon atoms, such as a total of at least 11 carbon atoms, e.g. between 11 and 18 carbon atoms.

In another embodiment, one or more of $R^1$, $R^2$, $R^3$, $R^4$, $R^5$ and $R^6$ is an alkyl or aryl group having between 1 and 18 carbon atoms. For example, one or two groups selected from $R^1$, $R^2$, $R^3$, $R^4$, $R^5$ and $R^6$ may be an alkyl or aryl group having between 1 and 18 carbon atoms and the others are hydrogen, e.g. $R^1$ and $R^2$, $R^1$ and $R^3$, $R^1$ and $R^4$, $R^1$ and $R^5$, $R^1$ and $R^6$, $R^2$ and $R^3$, $R^2$ and $R^4$, $R^2$ and $R^5$, $R^2$ and $R^6$, $R^3$ and $R^4$, $R^3$ and $R^5$, $R^3$ and $R^6$, $R^4$ and $R^5$, $R^4$ and $R^6$ or $R^5$ and $R^6$ are alkyl or aryl groups having between 1 and 18 carbon atoms and the others are hydrogen.

In another embodiment, one or more of $R^1$, $R^2$, $R^3$, $R^4$, $R^5$ and $R^6$ is an alkyl group having between 1 and 18 carbon atoms. For example, one or two groups selected from $R^1$, $R^2$, $R^3$, $R^4$, $R^5$ and $R^6$ may be an alkyl group having between 1 and 18 carbon atoms and the others are hydrogen, e.g. $R^1$ and $R^2$, $R^1$ and $R^3$, $R^1$ and $R^4$, $R^1$ and $R^5$, $R^1$ and $R^6$, $R^2$ and $R^3$, $R^2$ and $R^4$, $R^2$ and $R^5$, $R^2$ and $R^6$, $R^3$ and $R^4$, $R^3$ and $R^5$, $R^3$ and $R^6$, $R^4$ and $R^5$, $R^4$ and $R^6$ or $R^5$ and $R^6$ are alkyl groups having between 1 and 18 carbon atoms and the others are hydrogen.

In another embodiment, one or more of $R^1$, $R^2$, $R^3$, $R^4$, $R^5$ and $R^6$ is an alkyl group having between 6 and 18 carbon atoms. For example, one or two groups selected from $R^1$, $R^2$, $R^3$, $R^4$, $R^5$ and $R^6$ may be an alkyl group having between 6 and 18 carbon atoms and the others are hydrogen, e.g. $R^1$ and $R^2$, $R^1$ and $R^3$, $R^1$ and $R^4$, $R^1$ and $R^5$, $R^1$ and $R^6$, $R^2$ and $R^3$, $R^2$ and $R^4$, $R^2$ and $R^5$, $R^2$ and $R^6$, $R^3$ and $R^4$, $R^3$ and $R^5$, $R^3$ and $R^6$, $R^4$ and R, $R^4$ and $R^6$ or $R^5$ and $R^6$ are alkyl groups having between 6 and 18 carbon atoms and the others are hydrogen.

In another embodiment, one of $R^1$, $R^2$, $R^3$, $R^4$, $R^5$ and $R^6$ is an alkyl group having between 1 and 18 carbon atoms, such as between 6 and 18 carbon atoms, e.g. between 11 and 18 carbon atoms.

In another embodiment, $R^2$ and/or $R^5$ is an alkyl group having between 1 and 18 carbon atoms, such as between 6 and 18 carbon atoms, e.g. between 11 and 18 carbon atoms.

In another embodiment, $R^2$ and/or $R^5$ is an aryl group having between 1 and 18 carbon atoms.

In a preferred embodiment, the phenanthroline compound is 4-undecyl-1,10-phenanthroline covalently linked to an acidic group via a spacer, wherein said spacer comprises at least one carbon atom, such as two or three carbon atoms, In another preferred embodiment, the phenanthroline compound is 4,7-diundecyl-1,10-phenanthroline covalently linked to an acidic group via a spacer, wherein said spacer comprises at least one carbon atom.

Preferably, the spacer comprises 1 to 18 carbon atoms. In one embodiment, the spacer comprises at least 2, such as at least 3 carbon atoms, and the spacer is covalently linked at position 2, 3, 4, 5, 6, 7, 8 or 9 of the 1,10-phenanthroline compound.

In one embodiment, the acidic group is selected from the group consisting of: a carboxylic acid, a sulfonic acid, a sulfuric acid monoester, a sulfonamide, a phosphonic acid, a phosphoric acid, an arsenic acid, a sulfinic acid or a thiocarboxylic acid.

In a preferred embodiment, the acidic group is —(HPO$_4$)$R^7$, —(HPO$_3$)$R^7$, wherein $R^7$ is H, alkyl, branched alkyl, aryl, or substituted aryl, e.g. 4-octylphenyl.

In another embodiment, the ionophore has a tripodal stereochemical structure, such as one of the structures depicted in Formulas IV, V, VI and VII. In one further embodiment hereof, the acidic group is positioned distal of the malonamide group on one, two or three arms of the structure depicted in Formula IV, V, VI or VII. "Distal" in this context means distal relative to the center of the tripodal structure. Preferably, only one arm of the molecule has a covalently bound acidic group. In another embodiment, in one of the three arms of the structure depicted in Formulas IV, V, VI or VII, the malonamide group is partially or entirely replaced by the acidic group.

Further Membrane Components

Plasticizers—The membranes of the invention typically further comprise a plasticizer. The role of the plasticizer is to keep other components, such as the ionophore, solvated. Many suitable plasticizers, e.g. esters, phosphonates and ethers, have been described in the art. In one embodiment, the plasticizer is as 4-hexylphenyl 2-nitrophenyl ether (NHPE) or 2-nitrophenyl octyl ether (NPOE) or a mixture thereof. In one embodiment, the plasticizer, such as NHPE, constitutes about 40% to 80% of the dry membrane mass, e.g. between 50% and 70% of the dry membrane mass, such as between 55% and 65% of the dry membrane mass.

Polymers—The membranes of the invention typically further comprise a polymer or a mixture of polymers, a polymer blend. Polymers give the membrane structural integrity as they provide a network to contain the plasticizer and the active components. Non-limiting examples of polymers and co-polymers that may be used include poly(vinyl chloride), carboxylated poly(vinyl chloride), polyurethane, poly(vinyl chloride-co-vinyl acetate), poly(vinyl chloride-co-vinyl alcohol), poly(vinyl chloride-co-vinyl acetate-co-vinyl alcohol) and combinations of any of these.

In a preferred embodiment, the membrane comprises a polymer blend, wherein said polymer blend comprises:

a. a first polymer which is carboxylated poly(vinyl chloride) or poly(vinyl chloride), wherein the molecular weight of said first polymer is from 100,000 to 500,000, and b. a second polymer, which is a co-polymer of vinyl chloride and at least one further monomer group having a hydrophilic group, wherein the molecular weight of said second polymer is below 100,000, wherein, if said first polymer is carboxylated poly(vinyl chloride), said second polymer has more hydrophilic groups than said first polymer.

In one embodiment, said first polymer is carboxylated poly(vinyl chloride). In a further embodiment, said first polymer is carboxylated poly(vinyl chloride) and said second polymer has at least 1.5-fold more hydrophilic groups than said first polymer, such as at least 2-fold, e.g. at least 4-fold, such as at least 5-fold, e.g. at least 10-fold more hydrophilic groups than said first polymer. In an even further embodiment, said first polymer is carboxylated poly(vinyl chloride) and said carboxylated poly(vinyl chloride) is between 0.1% and 10% carboxylated, e.g. between 0.5% and 5% carboxylated, such as between 1% and 3% carboxylated, e.g. 1.8% carboxylated.

In another embodiment, said first polymer is poly(vinyl chloride).

In one embodiment, the molecular weight of said first polymer is at least 110,000, e.g. at least 120,000, such as between 130,000 and 400,000, e.g. between 130,000 and 300,000, e.g. between 130,000 and 250,000.

In one embodiment, said first polymer is carboxylated poly(vinyl chloride) and the molecular weight of said first polymer is at least 110,000, e.g. at least 120,000, such as between 130,000 and 400,000, e.g. between 200,000 and 300,000, e.g. between 200,000 and 250,000, e.g. 220,000.

In another embodiment, said first polymer is poly(vinyl chloride) and the molecular weight of said first polymer is at least 110,000, e.g. at least 120,000, such as between 120,000 and 200,000, e.g. between 130,000 and 160,000, e.g. 140,000.

In one embodiment of the membrane of the invention, said further monomer in the second polymer is vinyl alcohol, a vinyl ester or a hydroxy-functional acrylate. In a further embodiment, said second polymer is a co-polymer of vinyl chloride, vinyl acetate, vinyl alcohol and, optionally, a further monomer comprising a hydrophilic group, such as acrylic acid, methacrylic acid or maleic acid.

In an even further embodiment, said second polymer is poly(vinyl chloride-co-vinyl acetate-co-vinyl alcohol). In one embodiment, said poly(vinyl chloride-co-vinyl acetate-co-vinyl alcohol) comprises between 75% and 98% vinyl chloride, such as between 85% and 95% vinyl chloride, e.g. between 89% and 93% vinyl chloride, such as 91% vinyl chloride. In another embodiment, said poly(vinyl chloride-co-vinyl acetate-co-vinyl alcohol) comprises between 1% and 20% vinyl acetate, such as between 1% and 10% vinyl acetate, e.g. between 1% and 5% vinyl acetate, such as 3% vinyl acetate. In a further embodiment, said poly(vinyl chloride-co-vinyl acetate-co-vinyl alcohol) comprises between 1% and 15% vinyl alcohol, such as between 1% and 10% vinyl alcohol, e.g. between 4% and 8% vinyl alcohol, such as 6% vinyl alcohol.

In one embodiment, the molecular weight of the second polymer is less than 100,000, e.g. between 30,000 and 90,000, preferably between 60,000 and 80,000, such as 70,000.

In one embodiment, the ratio of the first polymer mass to the second polymer mass in the membrane is between 10:1 and 1:5, e.g. between 4:1 and 1:4, such as between 2:1 and 1:3, e.g. between 2:3 and 3:7, such as 1:2.

In one embodiment, said first polymer is carboxylated poly(vinyl chloride) and the ratio of the first polymer mass to the second polymer mass in the membrane is between 4:1 and 1:4, such as between 2:1 and 1:3, e.g. between 3:2 and 3:7, or between 2:3 and 3:7 such as 1:2.

In another embodiment, said first polymer is poly(vinyl chloride) and the ratio of the first polymer mass to the second polymer mass in the membrane is between 10:1 and 1:5, such as between 7:1 and 1:2, e.g. between 5:1 and 1:2, such as between 5:1 and 2:3, e.g. between 5:1 and 2:1, such as 4:1.

In one embodiment, the polymer blend constitutes about 10% to 50% of the dry membrane mass (i.e. the mass of the components before mixing in solvent), e.g. between 20% and 40% of the dry membrane mass, such as between 25% and 35% of the dry membrane mass, e.g. between 25% and 30% of the dry membrane mass.

In a preferred embodiment, the membrane has the composition specified in Table 1 below.

TABLE 1

Wet and dry mass composition of the mixed membrane solution.

| Component | Wet mass (%) | Dry mass (%) |
|---|---|---|
| Hemi-Mg-bis-[4-octylphenyl]phosphate | 1.49 | 4.58 |
| Hemi-Ca-bis-[4-octylphenyl]phosphate | 0.26 | 0.81 |
| 4,7-Diundecyl-1,10-phenanthroline (DUP) | 2.41 | 7.40 |
| 1.8% carboxylated PVC | 3.07 | 9.42 |
| PVC co-Polymer* | 6.15 | 18.89 |
| 4-hexylphenyl 2-nitrophenyl ether (NHPE) | 19.17 | 58.90 |
| Cyclohexanone, Sigma C102180 | 67.46 | |

*poly(vinyl chloride-co-vinyl acetate-co-vinyl alcohol) having a content of 91% vinyl chloride, 3% vinyl acetate and 6% vinyl alcohol.

Electrodes and Potentiometric Sensors

In a further main aspect, the invention relates to an ion-selective electrode comprising the ion selective membrane of the invention as described herein. The electrode may be made on a support by using thick film approach e.g. screen printing, rotogravure, pad printing, stenciling conductive material such as carbon, Cu, Pt, Pd, Au, and/or nanotubes, etc. or by using thin film approach e.g. by sputtering, thermal spraying and/or cold spraying conductive material. The support may be flexible or rigid. The support is preferably made of non-conducting material such as silicon, polymer, a printed circuit board (PCB), flex-PCB, polyethylene terephthalate (PET), polyimide (PI), ceramic, alumina, glass, wood product, frit, etc.

In an even further main aspect, the invention relates to a sensor assembly where two or more analyte electrodes are present on a single support with or without a reference electrode (see e.g. U.S. Pat. No. 5,916,425 for a sensor assembly including a reference electrode). In some embodiments, the sensor assembly is made of two supports each comprising two or more analyte electrodes with or without a reference electrode. The supports may be placed in a layered structure on top of each other such that the surfaces of said supports with the electrodes are facing each other (see e.g. WO2008/131767). Alternative suitable sensor assemblies have been described in WO2018/112017, WO2018/112012, WO2018/112008, WO2017/120464, WO2017/019609, WO2016/106320, WO2016/011308, WO2016/007716 and WO2013/163120.

In one embodiment, the system is calibrated with calibrators containing physiological concentrations of potentially interfering compounds ($Ca^{2+}$, $K^+$ and $Na^+$).

In some embodiments, the system contains one or more electrodes for measurement of other cations, e.g. calcium ions, so that interference can be minimized by chemometric correction of the analyte signal based on measurements of the activity of the cations.

Uses and Methods of Use

As described above, in a further main aspect, the invention relates to the use of a potentiometric sensor or electrode according to the invention for the determination of the concentration of ions, such as magnesium ions, in a sample.

Similarly, the invention relates to a method of determining the concentration of ions, such as magnesium ions, in a liquid sample comprising contacting said sample with an electrode according to the invention or a potentiometric sensor according to the invention and determining the ion concentration based on signal provided by said electrode or potentiometric sensor.

A biological sample tested for the presence of an analyte may be a physiological fluid such as diluted or undiluted whole blood, serum, plasma, saliva, urine, feces, pleura, cerebrospinal fluid, synovial fluid, milk, ascites fluid, peritoneal fluid or amniotic fluid. Examples of other biological samples include fermentation broths, microbial cultures, waste water, food products and the like.

In a preferred embodiment, the sample is a blood sample or a serum sample. A sample, such as a blood sample, a serum sample, a plasma sample or a pleural sample can e.g. be a sample from a human subject.

The purpose of determining the magnesium ion levels may e.g. be to diagnose a disease or disorder in a patient, such as a human patient, or to monitor magnesium levels in a patient undergoing, or being enrolled for a treatment, such as medical therapy or surgery. In one embodiment, the disease or disorder is a cardiovascular disease or disorder. In another embodiment, the sample is a sample from a newborn, i.e. an infant of less than 28 days old.

Zhang (2011) Am J Biomed Sci 3:301 summarizes a number of studies which demonstrate an association between magnesium levels, in particular hypomagnesemia, and clinical outcomes. For example, studies have demonstrated association of hypomagnesemia and mortality rates in ICU patients experiencing hemodialysis, type 2 diabetes, cardiovascular diseases, or medical surgical intensive care. Furthermore, in heart disease patients, magnesium deficiency has been found to contribute to coronary vasospasm, arrhythmias, fibrillation, infarction, and sudden death. A study on magnesium intervention during cardiopulmonary bypass operations showed that intraoperative correction of iMg is associated with a reduction in postoperative ventricular arrhythmia and maintenance of an uninterrupted sinus rhythm. Clinical trial results also suggest a benefit for magnesium therapy for acute stroke patients in the ambulance or emergency department within the first two hours of the onset of stroke symptoms. Magnesium monitoring is also advocated in preeclampsia, a condition reported to be linked with hypomagnesemia and which occurs in 5-7% of pregnancies in Europe and the USA. Other findings have suggested that the ratio of iCa:iMg is a crucial diagnostic parameter for prevention of vascular and neurological complications in preeclampsia-eclampsia patients. Soliman et al. (2003) *Crit. Care Med.* 31:1082 reported a correlation between the onset of ionized hypomagnesemia during ICU stays and high morbidity and mortality rates.

Thus, in further embodiments, the sample in which the magnesium ion level is determined in the method or use according to the invention, may e.g. be a sample from a patient in acute admission or from a patient undergoing, or enrolled for, medical therapy or surgery, such as cardiac surgery, e.g. a cardiopulmonary bypass operation. In further embodiments, the sample is from a patient with poor food intake, a malabsorption disorder, hypokalemia, hypocalcemia, alcoholism or from a patient taking diuretics or other drugs associated with hypomagnesemia. In further embodiments, the sample is from a patient having renal disease, hypertension, preeclampsia, diabetes mellitus, diabetic ketoacidosis, arrhythmia, sepsis, chest pain, acute stroke, trauma chock, burns/smoke inhalation, acute lung diseases or a cardiac disease, such as cardiac arrest. In another embodiment, the patient is a patient at the maternity ward or a patient undergoing haemodialysis. Furthermore, the sample may be from an ICU patient experiencing hemodialysis, type 2 diabetes, cardiovascular diseases, or medical surgical intensive care.

The present invention is further illustrated by the following examples, which should not be construed as limiting the scope of the invention.

EXAMPLES

Example 1: Preparation of Ion Selective Membranes

A stock solution of hemi-magnesium bis[4-octylphenyl] phosphate (MgOPP) was prepared by mixing MgOPP and cyclohexanone (>99.8%) in a ratio of 48.28 grams of cyclohexanone per gram of MgOPP. The compounds were mixed at room temperature and subsequently stirred in the dark for a minimum of 8 hours at room temperature or stirred for a minimum of 4 hours at 37° C.

A membrane dispensing solution was prepared by mixing the following components:

| Compound | Quantity |
| --- | --- |
| hemi-calcium bis[4-octylphenyl]phosphate | 0.00263 ± 2% |
| 4,7-diundecyl-1,10-phenanthroline | 0.02410 ± 2% |
| Poly(vinyl chloride-co-acrylic acid (carboxylated PVC - 1.8% carboxyl basis - MW~220,000 | 0.03073 ± 1.5% |
| Poly(vinyl chloride-co-vinyl acetate-co-vinyl alcohol) - PVC co-polymer containing 3% of vinyl acetate and 6% of vinyl alcohol - Mr~24,500 (Fluka 27827) | 0.06148 ± 1.5% |
| 4-hexylphenyl 2-nitrophenyl ether (NHPE) | 0.19173 ± 1.5% |
| MgOPP stock solution in cyclohexanone | 0.68932 ± 0.5% |

The compounds were mixed in vials filled with argon or nitrogen gas at room temperature and subsequently stirred in the dark for a minimum of 40 hours at room temperature or stirred for a minimum of 16 hours at 37° C. The resulting solution was used for dispensing membranes onto a poly(3, 4-ethylenedioxythiophene)-poly(styrenesulfonate)-(PEDOT-) covered gold electrode on a ceramic support. The solvent was subsequently allowed to evaporate to obtain the plasticized ion selective membrane.

Example 2: Comparison of Membranes Having Various Lipophilic Salt Compositions Three membranes with various lipophilic salt compositions were prepared, essentially as described in Example 1:

1. Membrane Mg899 contained hemi-calcium bis[4-octylphenyl]phosphate, but no hemi-magnesium bis[4-octylphenyl]phosphate
2. Membrane Mg900 contained hemi-magnesium bis[4-octylphenyl]phosphate, but no hemi-calcium bis[4-octylphenyl]phosphate
3. Membrane Mg901 contained 50% hemi-calcium bis[4-octylphenyl]phosphate and 50% hemi-magnesium bis [4-octylphenyl]phosphate Each membrane was dispensed onto two to three individual electrodes of an electrode array, which also contained a $Ca^{2+}$ ion selective electrode. The membranes were dispensed as described in Example 1. Each electrode array was placed into a measuring chamber in a test analyzer. The measuring chamber had fluidic contact with a reference electrode. The test analyzer was programmed for automatic control of liquid transport of calibration and rinse solutions, aspiration of samples, sampling of the potentiometric signal of each electrode position, and data acquisition thereof.

The ion selective electrodes were contacted with a rinse solution of 0.25 mM $Mg^{2+}$ and 0.5 mM $Ca^{2+}$ for approx. 1 h 10 m with intermediate exchanges of the rinse solution in conjunction with sensor calibrations. At ~1 h 12 m, after ~2 min idle exposure to the same rinse solution (last calibration activity ended at 1 h 10 m), the magnesium ion concentration in a blood sample was determined by 5 repetitive measurements.

The $Mg^{2+}$ ion selective electrodes were calibrated using three calibration solutions containing $Mg^{2+}$ and $Ca^{2+}$ ions in three different ratios in a complex solution matrix suitable for a simultaneous calibration of other sensors, e.g. Na, K, Ca, Cl, pH, $pO_2$, $pCO_2$, Glucose and Lactate sensors. The Nicolsky-Eisenman (NE) equation was used as sensor response model in accordance with IFCC guidelines (Ben Rayana et al. (2008) Clin Chem Lab Med 46(1):21). Status value (E0), sensitivity (S) and selectivity coefficient (K) for $Mg^{2+}$ ions over $Ca^{2+}$ ions, were determined based on the electrode signals obtained on the calibration solutions. The $Ca^{2+}$ ion selective electrodes were also calibrated.

For each $Mg^{2+}$ ion selective electrode, the concentration of $Mg^{2+}$ ions (cMg) in each blood sample was calculated from the signal obtained on that particular sample by utilizing the values of the calibration parameters (E0, S, and K) determined for the electrode prior to the sample measurement and the concentration of $Ca^{2+}$ ions determined with the $Ca^{2+}$ ion selective electrode. No corrections were subsequently applied to obtain the listed cMg values.

Two Mg899 membranes and three Mg900 and Mg901 membranes were tested in parallel to ensure identical equilibration history. The results are shown in Table below:

| Sensor | Mg899 | Mg899 | Mg901 | Mg901 | Mg901 | Mg900 | Mg900 | Mg900 |
|---|---|---|---|---|---|---|---|---|
| 1 h 12 m | 0.637 | 0.633 | 0.653 | 0.653 | 0.651 | 0.666 | 0.673 | 0.678 |
| 1 h 15 m | 0.653 | 0.651 | 0.647 | 0.646 | 0.650 | 0.641 | 0.639 | 0.640 |
| 1 h 18 m | 0.653 | 0.651 | 0.646 | 0.644 | 0.648 | 0.640 | 0.637 | 0.637 |
| 1 h 21 m | 0.652 | 0.651 | 0.646 | 0.645 | 0.648 | 0.642 | 0.638 | 0.640 |
| 1 h 24 m | 0.651 | 0.650 | 0.645 | 0.644 | 0.648 | 0.640 | 0.637 | 0.640 |

The data show that after an equilibration time of ~1 h 12 m the Mg899 and Mg900 membranes, containing 100% calcium salt and 100% magnesium salt, respectively, showed significant deviations from the values determined in the subsequent four repetitive measurements on the same sample (see underlined values). This demonstrates that these membranes require a long equilibration time in order not to change the composition of the rinse solution in front of the electrode during idle and thus were inferior to membrane Mg901 which contains both the calcium and the magnesium salt.

The invention claimed is:

1. A process for preparing an ion selective membrane which has selectivity for a primary analyte as well as another ion, wherein said process comprises adding, in any order,
   a) an ionophore,
   b) a lipophilic salt containing said primary analyte, and
   c) a lipophilic salt containing said other ion.

2. The process according to claim 1, wherein the molar ratio of the lipophilic salts defined in b) and c) is such that when the membrane is exposed to a rinse solution containing said primary analyte as well as said other ion, the equilibration time is shorter than when the membrane would not contain the lipophilic salt defined in c).

3. The process according to claim 1, wherein the molar ratio of the lipophilic salt containing said primary analyte defined in b) and the lipophilic salt containing said other ion defined in c) is between 99:1 and 1:1.

4. The process according to claim 1, wherein the primary analyte is magnesium ions, calcium ions, zinc ions or phosphate ions.

5. The process according to claim 1, wherein the primary analyte is magnesium ions and wherein the lipophilic salt defined in b) is a magnesium salt and the lipophilic salt defined in c) is a calcium salt.

6. The process according to claim 5, wherein the primary analyte is magnesium ions, the lipophilic salt defined in b) is a magnesium salt and the lipophilic salt defined in c) is a calcium salt, and wherein the rinse solution comprises magnesium ions and calcium ions in a molar ratio from 1:1 to 1:4.

7. The process according to claim 5, wherein the molar ratio of the lipophilic magnesium salt b) and the lipophilic calcium salt c) is between 99:1 and 1:1.

8. The process according to claim 1, wherein the ionophore is a phenanthroline compound which is 1,10-phenanthroline or a substituted form thereof.

9. The process according to claim 1, wherein the lipophilic salts defined in b) and c) comprise an acidic group.

10. The process according to claim 1, wherein the lipophilic salt defined in b) is hemi-magnesium bis[4-octylphenyl]phosphate and the lipophilic salt defined in c) is hemi-calcium bis[4-octylphenyl]phosphate.

11. A process for preparing an ion selective membrane which has selectivity for a primary analyte as well as another ion, wherein said process comprises adding:
   a) a lipophilic salt which is a salt of an ionophore covalently linked to an acidic group via a spacer and the primary analyte, and
   b) a lipophilic salt which is a salt of said ionophore and said other ion.

12. An ion selective membrane which has selectivity for a primary analyte as well as one or more other ions, wherein said membrane has not been in contact with an aqueous solution and comprises:
   a) an ionophore,
   b) a lipophilic salt containing said primary analyte, and
   c) a lipophilic salt containing said other ion.

13. The membrane according to claim 12, wherein the primary analyte is magnesium ions, calcium ions, zinc ions or phosphate ions.

14. An ion selective membrane which has selectivity for a primary analyte as well as another ion, wherein said membrane comprises:
   a) a lipophilic salt which is a salt of an ionophore covalently linked to an acidic group via a spacer and the primary analyte, and
   b) a lipophilic salt which is a salt of said ionophore and said other ion, and wherein said membrane preferably has not been in contact with an aqueous solution.

15. A method for producing an ion selective membrane for use in the measurement of ion concentration in a sample wherein said membrane has selectivity for a primary analyte as well as another ion, said method comprising:
   i) selecting a rinse solution in which the membrane is to be kept immediately prior to analysis of a sample, wherein said rinse solution contains said primary analyte as well as said other ion,
   ii) selecting an ion selective membrane composition comprising an ionophore (a), a lipophilic salt (b) containing said primary analyte, and a lipophilic salt (c) containing said other ion, wherein the molar ratio of the lipophilic salts defined in (b) and (c) is such that when the membrane is exposed to said rinse solution, the equilibration time is shorter than when the membrane would not contain the lipophilic salt defined in (c), and
   iii) producing a membrane having the composition selected in step ii) according to the process of claim 1.

16. An electrode for determining the magnesium ion concentration of a liquid sample comprising the membrane of claim 12.

17. A potentiometric sensor for determining the magnesium ion concentration of a liquid sample comprising the electrode of claim 16 and a reference electrode.

18. A method for determining the magnesium ion concentration of a liquid sample comprising contacting said sample with an electrode according to claim 16 and determining the magnesium ion concentration based on signal provided by said electrode or sensor.

19. A method for diagnosing a disease or disorder, said method comprising performing the method according to claim 18 on a sample of a subject, said method further comprising comparing the magnesium ion concentration in said sample with a reference magnesium ion concentration to diagnose hypomagnesemia or hypermagnesemia in said subject.

20. The process according to claim 9, wherein the lipophilic salts defined in b) and c) comprise a lipophilic salt of a compound comprising a structure of the formula I:

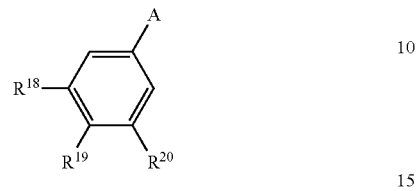

wherein A is an acidic group,
wherein one, two or all three of $R^{18}$, $R^{19}$ and $R^{20}$ is a $C_{4-18}$ group, which is a $C_{4-18}$ alkyl group, a $C_{4-18}$ alkenyl group, a $C_{4-18}$ alkynyl group, or an amide-containing $C_{4-18}$ group, wherein said $C_{4-18}$ group is linear at positions 1, 2 and 3, counting from the phenyl group, or in total only has one side chain at said positions 1, 2 and 3, and wherein the others of $R^{18}$, $R^{19}$ and $R^{20}$ independently are hydrogen, or a linear $C_{1-18}$ alkyl group.

* * * * *